United States Patent [19]

Miyoshi et al.

[11] 4,191,268
[45] Mar. 4, 1980

[54] DIGITAL WEIGHING MACHINE

[75] Inventors: Tsutomu Miyoshi; Shuichi Yanagita; Yushi Komachi, all of Tokyo, Japan

[73] Assignee: Tanita Corporation, Tokyo, Japan

[21] Appl. No.: 877,840

[22] Filed: Feb. 15, 1978

[30] Foreign Application Priority Data

Feb. 22, 1977 [JP] Japan .................................. 52/21061
Apr. 12, 1977 [JP] Japan .................................. 52/42203

[51] Int. Cl.$^2$ .............................................. G01G 3/02
[52] U.S. Cl. ........................... 177/210 C; 177/DIG. 3; 324/61 QS
[58] Field of Search ......... 177/210 C, 210 R, DIG. 3; 340/200; 324/61 QS, 61 R

[56] References Cited

U.S. PATENT DOCUMENTS

| | | | |
|---|---|---|---|
| 1,431,638 | 10/1922 | Dowling | 177/210 C |
| 3,966,002 | 6/1976 | Schneider | 177/210 C X |
| 4,041,289 | 8/1977 | Brosh | 177/1 X |
| 4,051,721 | 10/1977 | Williams | 324/61 QS X |
| 4,082,153 | 4/1978 | Provl | 177/DIG. 3 X |

FOREIGN PATENT DOCUMENTS 1088873 10/1967 United Kingdom ................ 177/210 C

*Primary Examiner*—Joseph W. Hartary
*Attorney, Agent, or Firm*—Harold L. Stowell

[57] ABSTRACT

A weighing machine wherein a mechanical change corresponding to weight of a body to be measured is taken out as an electric signal thereby to provide digital indication of the weight comprises a base body, a metering spring, a load supporting link associated with the metering spring and movable to displace the metering spring in response to the weight, a fixed electrode plate consisting of an electrically conductive flat plate secured to the base body, a movable electrode plate interlocked with the load supporting link and consisting of an electrically conductive flat plate intended to provide capacitance between the fixed and movable electrode plates and a digital indication and processing circuit for detecting change in the capacitance to provide digital indication of the weight. The digital indication and processing circuit comprises preferably an oscillator including capacitance as a component of an oscillating time constant and a converter for converting the change in oscillating frequencies of the oscillator to a digital amount representative of the weight.

7 Claims, 6 Drawing Figures

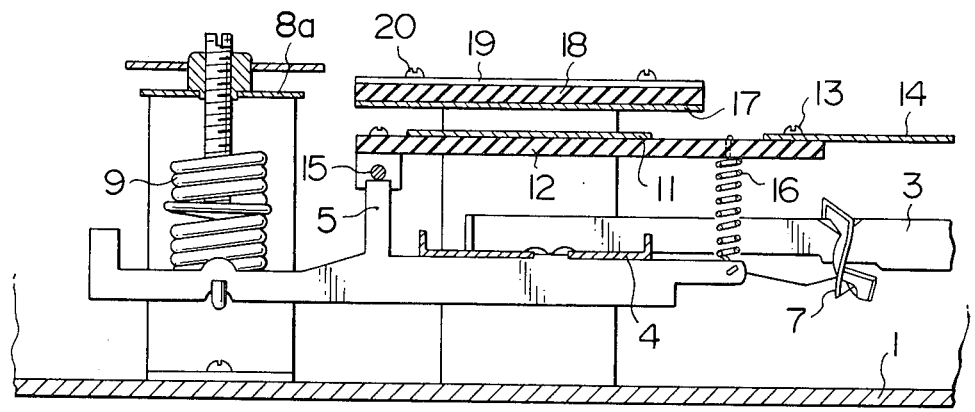
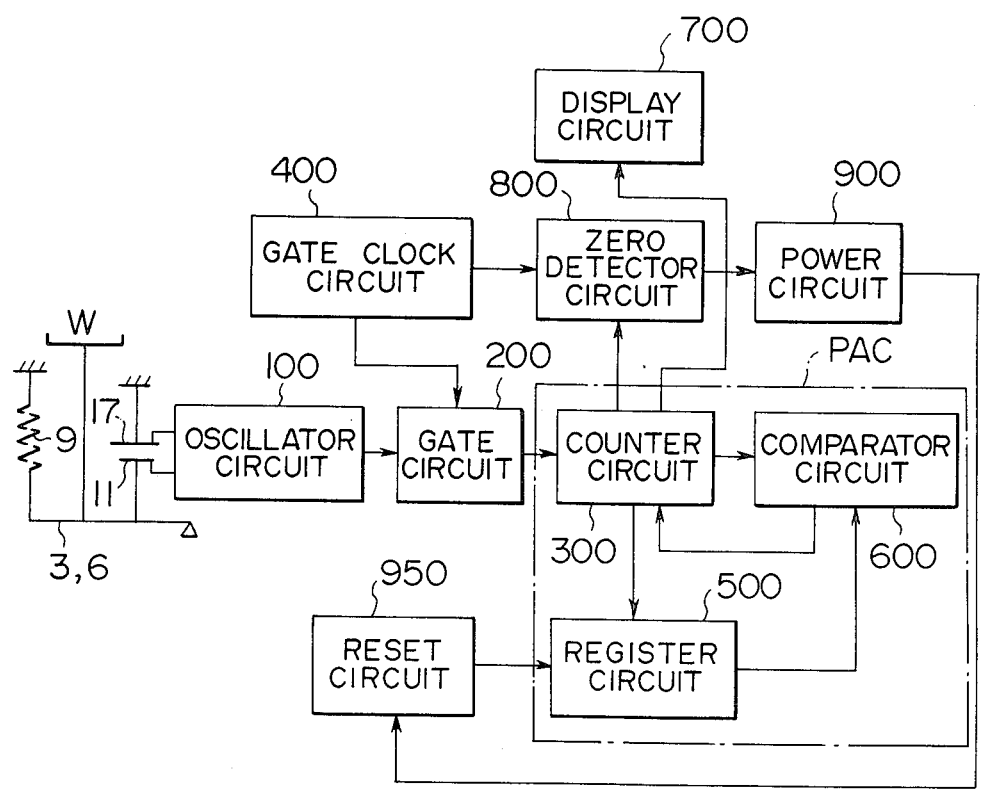

DIGITAL WEIGHING MACHINE

BACKGROUND OF THE INVENTION

1. Field of the Invention

This invention relates to a digital weighing machine and more particularly a digital weighing machine utilizing change in capacitance.

2. Description of the Prior Art

There have been proposed weighing machines of new type capable of indicating weight in a digital manner which replaced the prior art according to which weight is visually indicated by means of a fixed scale plate in cooperation with a rotary pointer adapted to rotate in response to the weight or a rotary pointer adapted to rotate in response to the weight associated with a fixed pointer. In one type of such weighing machine, i.e., a digital weight control including a differential transformer and a strain gauge used as a sensor, displacement (voltage) representative of weight is converted to a digital amount through an A/D converter and a mechanism of the like for transmitting the weight to the sensor has to be adjusted for correction of linearity in order to maintain linearity of an output voltage of the sensor with respect to the weight. Thus the weighing machine becomes complicated and difficult to adjust. In addition, zero point has to be adjusted mechanically and manufacturing becomes complicated. There was also great restriction of reliability and price.

In another type of devices employing a photo-electric decoder or a mechanical system in which a pointer moving in response to the weight is caused to follow by means of an electric motor or a spring and amount of movement is converted in the form of pulses for counting, amount of change to a sensor actuated in response to the weight is converted through rack and pinion and there are many frictional portions in a transmitting mechanism. For this reason, such devices are disadvantageous in respect to accuracy and reliability and there has been no such devices as to demonstrate advantages of high reliability possessed by a digital electronic device.

It is an object of the present invention to preclude these drawbacks and to provide a digital weighing machine with high accuracy which is wear resistant and very easy to assemble and has less friction.

It is another object of the invention to provide a digital weighing machine without any A/D converter which counter is capable of correcting error in mechanism in respect to linearity of weight indication and has no necessity to adjust a zero point mechanically.

SUMMARY OF THE INVENTION

According to one aspect of the present invention, there is provided a digital weighing machine wherein a mechanical change corresponding to weight of a body to be measured is taken out as an electric signal thereby to provide digital indication of the weight, comprising a base body, a metering spring, a load supporting link associated with said metering spring and movable to displace the metering spring in response to the weight, a fixed electrode plate consisting of an electrically conductive flat plate secured to said base body, a movable electrode plate interlocked with said load supporting link and consisting of an electrically conductive flat plate intended to provide capacitance between said fixed and movable electrode plates and a digital indication and processing circuit for detecting change in said capacitance to provide digital indication of the weight.

According to another aspect of the invention, there is provided a digital weighing machine wherein a mechanical change corresponding to weight of a body to be measured is taken out as an electric signal thereby to provide digital indication of the weight, comprising a base body, a metering spring, a load supporting link associated with said metering spring and movable to displace the metering spring in response to the weight, a fixed electrode plate consisting of an electrically conductive flat plate secured to said base body, a movable electrode plate interlocked with said load supporting link and consisting of an electrically conductive flat plate intended to provide capacitance between said fixed and movable electrode plates and a digital indication and processing circuit for detecting change in said capacitance to provide digital indication of the weight, said digital indication and processing circuit including an oscillator having said capacitance as a component of oscillating time constant and means for converting change in oscillating frequency of said oscillator to a digital amount representative of said weight.

BRIEF DESCRIPTION OF THE DRAWINGS

FIG. 2 is a partially sectioned side view of a weight detecting portion of the weight counter shown in FIG. 1;

FIG. 3 is a block diagram showing one embodiment of a digital indication circuit of the digital weighing machine according to the invention;

DESCRIPTION OF THE PREFERRED EMBODIMENTS

Figure 1:
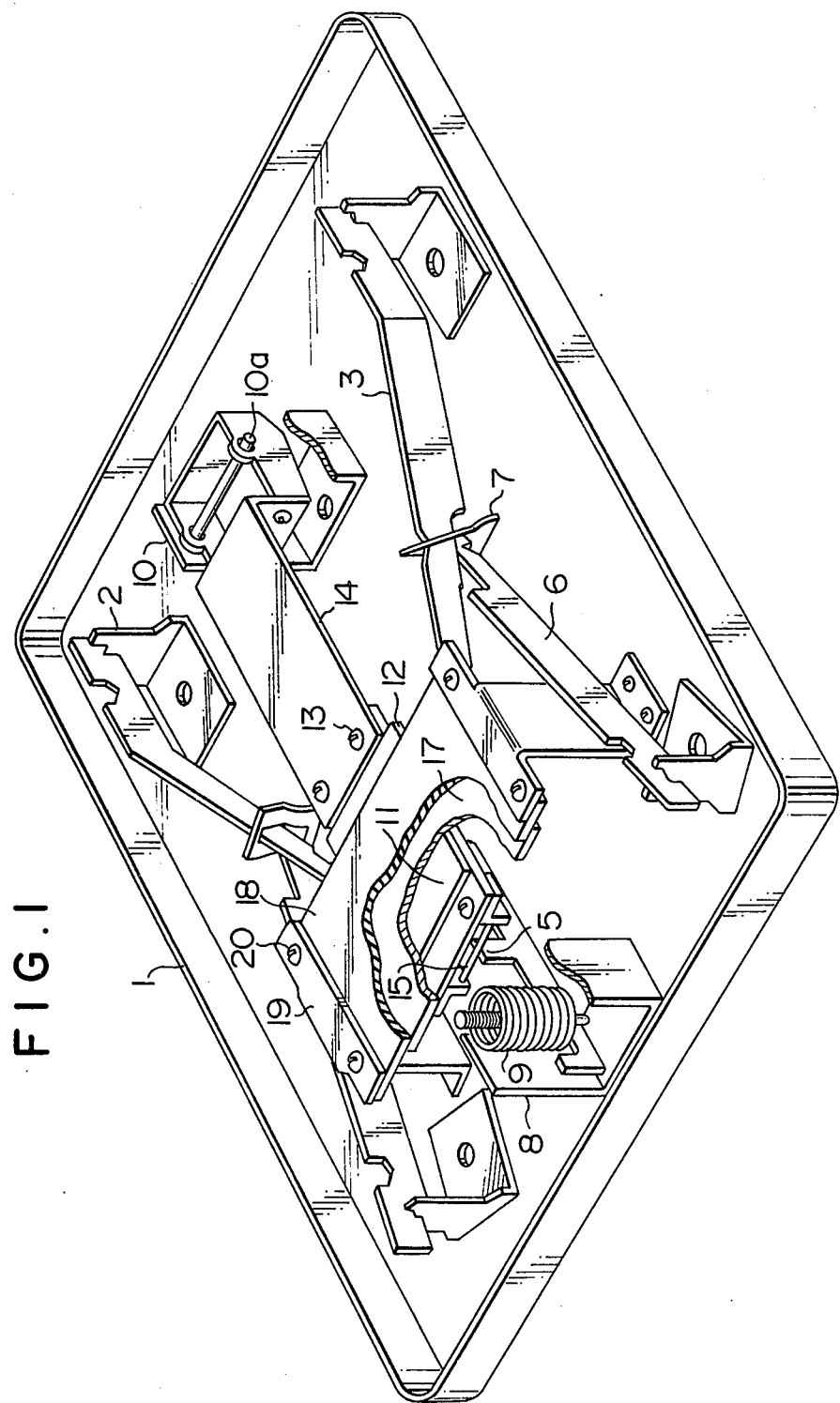
FIG. 1 is a partially fragmentary perspective view of one embodiment of a digital weighing machine according to the present invention with its upper cover removed.

The invention will now be described in detail with respect to one embodiment thereof by reference to the drawings and in particular to FIGS. 1 and 2. Reference numeral 1 designates a base on the four corners of which are mounted bases edges 2. Reference numeral 3 designates a long load support link fixed by a fixing plate 4. Reference numeral 5 designates a hanger secured to the fixing plate 4. Reference numeral 6 designates a short load support link associated with the long load support link 3 through hanging ring 7. Reference numeral 8 designates a first frame for a supporting mechanism, 9 is a metering spring which is engaged with a support plate 8a resting on the first supporting mechanism frame 8 (FIG. 2).

On the other hand, reference numeral 10 designates a second frame for a supporting mechanism carrying a movable electrode plate 11 consisting of an electrically conductive flat plate. Reference numeral 12 is an insulating plate insulating the movable electrode plate 11 and a support frame 14 fixed by screws 13, 13 is supported by a shaft 10a.

Reference numeral 15 designates a link pin joining with a hanger 5 secured to the insulating plate 12. Reference numeral 16 designates a spring which rests on the fixing plate 4 and engages with the insulating plate 12.

Reference numeral 17 designates a fixed electrode plate consisting of an electrically conductive flat plate which is insulated by the insulating plate 18 and is secured to the support frame 19 by a screw 20 and to the base 1.

Operation will now be described.

The weighing machine according to the present invention operates like the prior art weighing machine and the operation is such that the long and short links 3 and 6 are pushed down, so that the movable electrode plate 11 moves downwards with respect to the shaft 10a of the support mechanism frame 10 through the hanger 5 and the link pin 15 in response to length of extension of the metering spring 9. Capacity between electrodes for the amount of downward movement is detected to provide digital indication.

The insulating plate 12 supporting the movable electrode plate 11 is supported at the movable joining point of the hanger 5 and the link pin 15 and is always stretched by the spring 16 towards the fixing plate 4 of the long link. Thus contact pressure of the hanger 5 with the link pin 15 is always kept constant regardless of weight and exact change in capacitance responsive to the weight can be obtained and no error in twist of the mechanism occurs. Furthermore, it is preferred that the movable electrode plate 11 has a smaller area than that of the fixed electrode plate 17. This permits no change in capacitance against a little movement of the movable electrode plate 11 in the forward or backward direction or in the rightward or leftward direction with the result that more accurate result can be expected.

Explanation will now be given to the embodiment of the digital indication and processing circuit of the digital weighing machine according to the present invention by reference to FIGS. 3 to 6.

Referring now to FIG. 3, reference numerals 3 and 6 designate the long and short load support links respectively which were explained by reference to FIGS. 1 and 2 of the drawings. Reference numeral 9 designates a metering spring as in FIG. 1 and reference numerals 17 and 11 designate a fixed electrode plate and a movable electrode plate, respectively, as in FIG. 1. Reference symbol W designates a load put onto the weighing machine.

Figure 4:
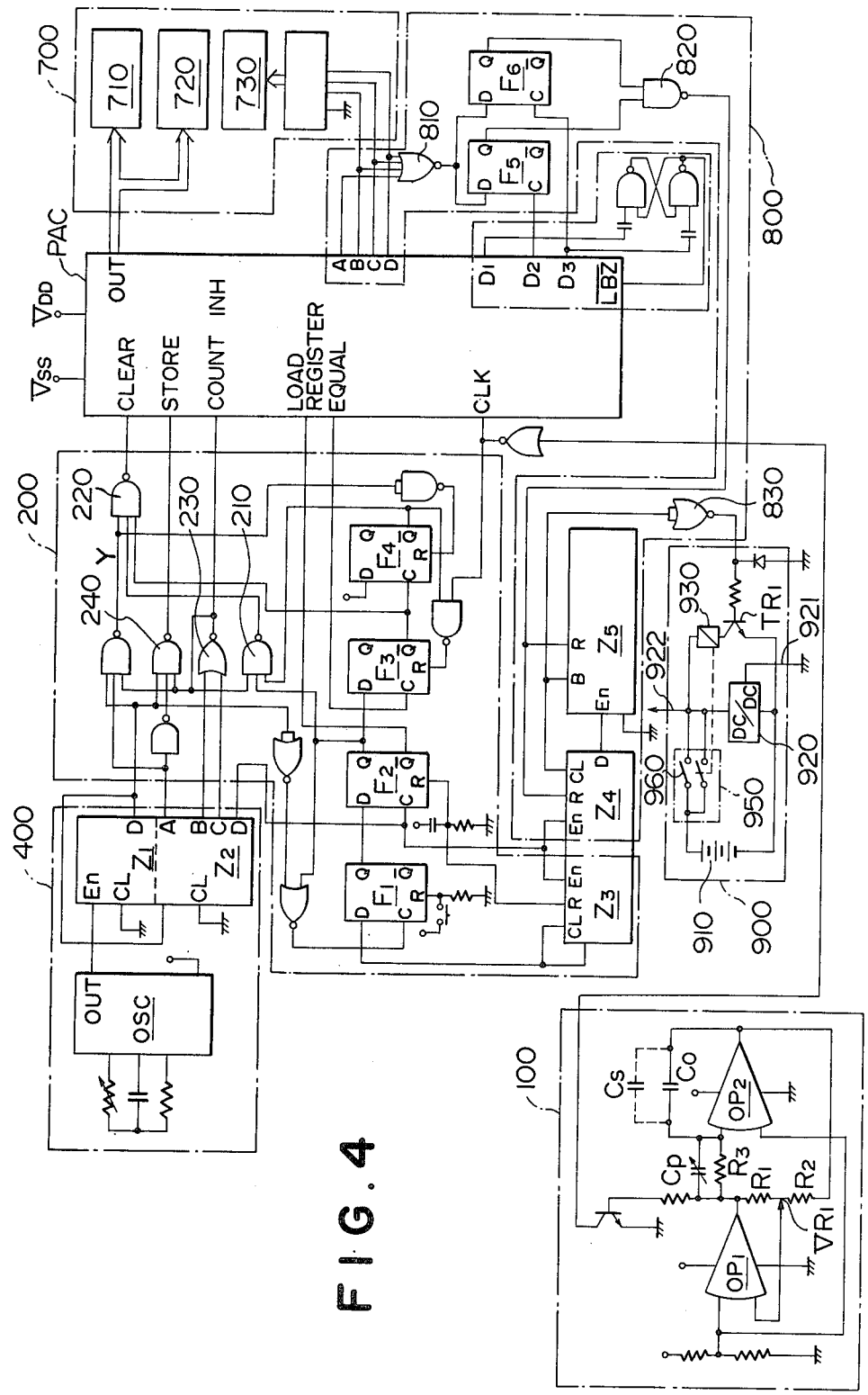
FIG. 4 is a detailed wiring diagram of the digital indication and processing circuit of FIG. 3.

Reference is then made to FIGS. 3 and 4 of the drawings to explain the structure of the digital indication and processing circuit. Reference numeral 100 designates an oscillator circuit which includes capacitance between the fixed electrode plate 17 of the weighing machine and the movable electrode plate 11 mounted on the movable portion responsive to the weight as a component of an oscillator time constant. The details of the oscillator circuit 100 are illustrated in a block 100 in FIG. 4 in which two operational amplifiers $OP_1$ and $OP_2$ are principally contained. Co indicates capacitance between the electrode plates 17 and 11. There is provided a variable resistor $VR_1$ for varying ratio of voltage division of resistors $R_1$ and $R_2$. A variable capacitance Cp is provided for compensation for disturbance of proportional relation between the weight and the oscillating frequency caused by stray capacity Cs caused by the influence of lead-in wires or the like from the electrode plates 17 and 11. If it is assumed that the area of the movable electrode plate 11 is "S" and the distance between the electrode plates 17 and 11 determined by the weight is "d" and if the compensation capacity Cp is selected to be equal to $C_s(R_2/R_1)$, the oscillation frequency f of the oscillator circuit 100 will be expressed by the following equation:

$$f = d/4\epsilon S R_3 \cdot R_1/R_2$$

where $\epsilon$ is a dielectric constant.

As evident from the above equation, if the distance "d" between the electrodes is arranged to change in proportion to the weight, it will be possible to obtain an oscillation frequency proportional to the weight.

Reference numeral 200 designates a gate circuit. A counter circuit 300 adapted to count the oscillation frequency of the oscillator circuit 100 corresponding to the weight by means of BCD output of counters $Z_1$ and $Z_2$ produced by a gate clock circuit 400, a register circuit 500 for memorizing the initial frequency (at the time of no load) and a comparator circuit 600 for continuously comparing the initial frequency with the frequency at the time of loading, constitute an IC package PAC. The gate circuit 200 comprises seven NAND gates, three NOR gates and four flip-flop circuits $F_1$ to $F_4$ for controlling an integrated circuit PAC and further includes a counter $Z_3$ which provides timing of counting and memorizing the initial frequency (no load) for a constant period after switching on.

This integrated circuit PAC has an input terminal CLK for counting frequencies corresponding to the weight; a terminal CLEAR for cleaning the contents of the counter 300; a store terminal STORE for temporarily latching the contents of the counter; a count inhibit terminal COUNT INH for temporarily inhibiting the count; a load register terminal LOAD REGISTER for memorizing the frequency $f_o$ of the oscillator circuit 100 at its initial condition after reading thereof; an equal output terminal EQUAL from which a pulse is delivered when the memorized frequency $f_o$ is always compared with the frequency f obtained when the weight is applied to the weighing machine by the comparator circuit 600 and there is coincidence of frequencies; a zero blanking LBZ for permit unnecessary zero in the display circuit 700, for example numerical display 710, 720, 730, to be displayed as 9.2 Kg instead of 09.2 Kg; a group of output terminals OUT for display of digital numerals; a group of BCD output terminals A, B, C, D for utilizing the last figure of the weight to display it every 200 grs. or 500 grs. and digit strobe terminals $D_1$, $D_2$, $D_3$ and so on.

A zero detector circuit 800 feeds its output to the terminal D of the flip-flop circuits $F_5$, $F_6$ through NOR gate 810 from BCD output terminals A, B, C, D of the integrated circuit PAC and the zero condition of the upper two figures of the display circuit 700 is fed to the input terminal C of the circuits $F_5$, $F_6$ from the digit strobe terminals $D_2$, $D_3$. The condition D is transferred to Q of the circuits $F_5$ and $F_6$ and is connected to the reset terminal of the counters $Z_4$, $Z_5$ which provides a timer function through the NAND gate 820. The output of these counters is fed to the base of a switching transistor $TR_1$ of a power source circuit 900 which will be described hereinafter so as to switch off the electric power to the circuit of each block. The power source circuit 900 contains a poweron reset circuit 950 and is so constituted that a battery power source 910 is provided with a DC-DC converter 920 for boosting a voltage through the power-on switch 960 and the switching transistor $TR_1$ connected in series with a reed relay 930 is connected in parallel to the battery power source 910 and electric power is supplied to the circuit portion of each block from the output terminals 92 and 922 of the DC-DC converter 920.

It is to be noted that the transistor $TR_1$ is so constructed that the pulse delivered from the zero detector circuit 800 is fed to the base thereof to cut off the supply power.

Figure 5:
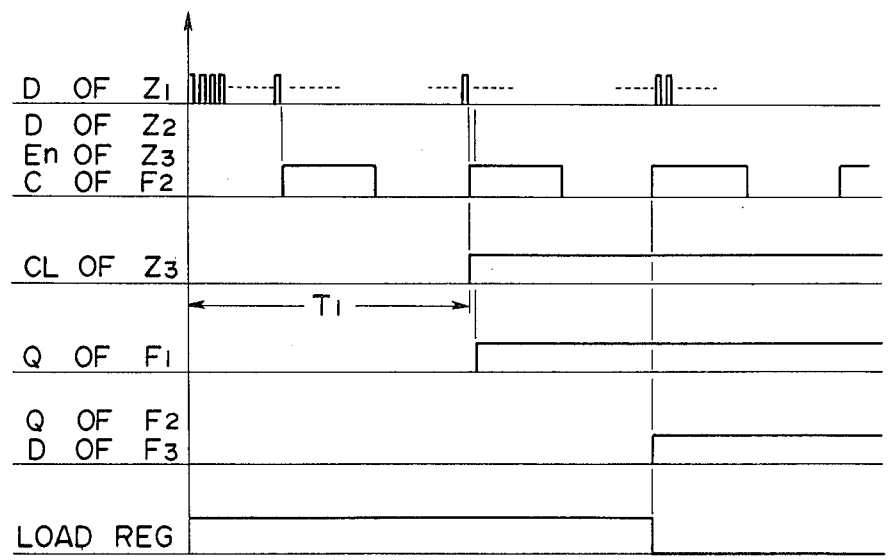
FIG. 5 is a timing view illustrating signals at each point in the circuit of FIG. 4.
Figure 6:
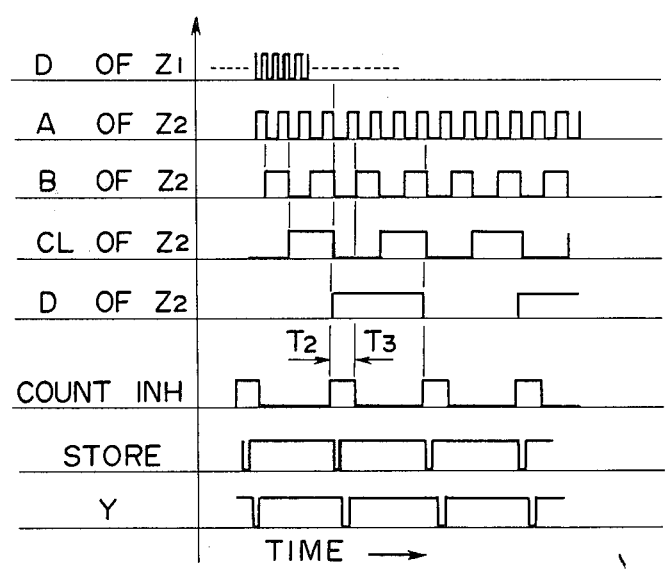
FIG. 6 is a timing view similar to FIG. 5.

Operation will now be described on the digital indication and processing circuit by reference to FIGS. 5 and 6 of the drawings.

When the power-on switch 960 of the electric power circuit 900 is manually switched on, the battery power source 910 is applied to the DC-DC converter 920, so that a high voltage (hereinafter called "H level") is applied to the base of the switching transistor $TR_1$ thereby to turn on the transistor $TR_1$ and the reed relay 930 but to switch off the power-on switch 960. Thereafter so far as a low voltage (hereinafter called "L level") is not applied to the base of the transistor $TR_1$, the power source circuit does not turn off. When the power source is applied to each circuit, CL terminal of the counter $Z_3$ counts clock pulses delivered from the terminal D of the counter $Z_2$ for a constant period $T_1$ as shown in the timing chart of FIG. 5 and maintains H level, and the output Q of the circuit $F_2$ will be of H level at the raise of the output pulse at the terminal D of the counter $Z_2$ while the output $\bar{Q}$ of the circuit $F_2$ will be of L level. As a result, the integrated circuit PAC will have an L level at its LOAD REGISTER and the initial value $f_o$ (not load) of the frequency of the oscillator circuit 100 corresponding to the weight received at the clock counter CLK has been memorized by the register circuit 500 and at the same time the output Q of the circuit $F_2$ will have an H level. Thus there will be an L level at the clear terminal ClEAR of the integrated circuit PAC through NAND gates 210 and 220 and the portion of the display circuit 700 will display 0.0 and is set to a measurement standard of the weight.

When a body to be weighed is put onto the weight counter, there will be a corresponding change in capacitance Co and the oscillation circuit 100 will change its oscillation frequency and the oscillation frequency output f is fed to an input terminal of the clock counter CLK of the integrated circuit PAC. At the time (the point "a" in FIG. 5) when the frequency f thus fed coincides with the frequency $f_o$ memorized as the frequency at the time of initial value (no load) in the register circuit 500, a pulse representative of coincidence is delivered from the equal terminal EQUAL and the output $\bar{Q}$ of the circuit $F_3$ will have an L level and clears the contents of the counter 300 contained in the integrated circuit through NAND gate 220. After that, as shown in the timing chart of FIG. 6, a store pulse is formed through NAND gate 240 by the output D of the counter $Z_1$, the output A of the counter $Z_2$ and the count inhibit pulse for the period of the count inhibit pulses $T_2$ and $T_3$ formed through NOR gate 230 by the binary output terminals B and C of the counter $Z_2$ so as to permit the counter circuit 300 to latch the number of counts representative of frequency $\Delta f$ corresponding to the weight thereby to indicate the counted value in the display circuit 700. In other words, the frequency $f_o$ corresponding to the condition where no weight is applied is subtracted from the frequency f corresponding to the condition where weight is applied and the differential frequency $\Delta f$ representative if the net weight is indicated in a digital manner.

When, after completion of measurement, the condition (zero condition) where no weight is applied is maintained for a predetermined period of time, the group of BCD output terminals A, B, C, D of the integrated circuit PAC will all have an L level and data of an H level is fed to the inputs D of the circuits $F_5$ and $F_6$. Then the contents (H level) of the input D of the circuits $F_5$ and $F_6$ are transferred respectively to the outputs Q by means of the timing pulses of the upper two figures among the strobe terminals of the integrated circuit PAC, and the reset terminals R of the counter circuits $Z_4$ and $Z_5$ are maintained at the L level through NAND gate 820. Then the counters $Z_4$ and $Z_5$ begin to count clock pulses at D of the counter $Z_2$ and, after counting for a constant time, the output at the clock terminal CL of the counter $Z_4$ combined with that at the terminal B of the binary output of the counter $Z_5$ will be of H level and the base of the switching transister $TR_1$ will have L level through NOR gate circuit 830 as explained in the foregoing and will be cut off with the result that the reed relay 930 is turned off and the power source voltage is cut thus to disconnect the power source for the whole system. In such a way, measurement of weight is finished.

As mentioned above, the weighing machine according to the present invention has less mechanical frictional parts than the prior art owing to employment of capacitive detection, has simple structure, is very easy to assembly because of no necessity of rack-pinion and absence of rotary portions and permits digital indication of weight with high accuracy.

In addition, the weighing machine according to the invention requires no A/D converter but carries out direct counting, and is able to provide easy electronic correction of non-linearity caused by a stray capacitance Cs inherent to mechanism of conversion of capacitance corresponding to weight by means of a correction capacitor Cp of the oscillator 100 and is able to provide indication of weight in such a unit as Kg, pound and so on with the same mechanism of balance by adjusting oscillation frequency with a variable resistor $VR_1$. According to the present invention, zero adjustment is not needed because arrangement is such that the initial condition a the time of no load is set by the power-on reset circuit at the time of switching on of the power source and from that point of time the weight is only measured and indicated. On the contrary, the weighing machine according to the prior art needs zero adjustment prior to adjustment. It is also an advantage of the invention that a power is automatically switched off by means of an automatic power off circuiit after completion of measurement and operation becomes very simple. It is of great importance to note that the whole circuit is constituted by C-MOS which consumes very little power and a battery is enough to drive the weight counter and a long life thereof can be kept and the weighing machine is portable.

It is also possible in the course of manufacture of the weighing machine to rely on electronic circuits to carry out adjustment such as zero adjustment and linearity and time of restriction can considerably reduced. In this way, it is possible to provide a weighing machine which is suitable for mass production and permits digital indication of high accuracy and high reliability.

We claim:

1. A digital weighing machine comprising a base, a metering spring fixed at one end thereof to said base, a load supporting link mounted between said base and the other end of said metering spring and movable to displace the metering spring according to the weight of a body to be measured when applied to the load supporting link, a fixed electrode plate consisting of an electrically conductive flat plate secured to said base, a movable electrode plate consisting of an electrically conductive flat plate disposed opposite to said fixed electrode plate to provide an electrostatic capacitance therebetween and interlocked with said load supporting link so as to move away from or towards said fixed electrode plate with said movement of said load supporting link, an oscillator circuit including said electrostatic capacitance as a frequency determining parameter for generating an electric output having a frequency which varies with the change in said capacitance according to the weight of said body, a counter circuit for directly counting the frequency of the electric output from said oscillator circuit to provide a count representative of the weight of said body, a digital display for displaying the count from said counter, and an electric power circuit for said oscillator circuit, counter circuit and display, wherein said movable electrode plate is supported in a movable point contact relation with said load supporting link by a link pin and a spring is provided between said movable electrode plate and said load supporting link for keeping the point contact pressure constant at any time.

2. A digital weighing machine as set forth in claim 1 wherein said movable electrode plate has a smaller area than that of said fixed electrode plate.

3. A digital weighing machine as set forth in claim 1 wherein a circuit is associated with said counter circuit which permits said counter circuit to count the difference in frequency between the electric output of said oscillator circuit just before the weight of a body to be measured is applied to said loading supporting link and at the time when applied.

4. A digital weighing machine as set forth in claim 1 wherein said oscillator circuit includes a correction capacitor for correcting non-linearity due to stray capacitance.

5. A digital weighing machine as set forth in claim 1 wherein said oscillator circuit includes a variable resistor for adjusting its frequency determining parameter so as to provide a display reading in unit of kilogram or pound.

6. A digital weighing machine as set forth in claim 1 wherein means is associated with said electric power circuit which automatically turns off the power circuit wherever no load is continuously applied to said load supporting link for a predetermined time period after completion of any measurement.

7. A digital weighing machine as set forth in claim 1 wherein said oscillator circuit comprises a first operational amplifier and a second operational amplifier, each of said amplifiers having a first input, a second input and an output, the first input of said first operational amplifier being connected to the second input of said second operational amplifier, said electrostatic capacitance being connected between the first input and the output of said second operational amplifier, a first resistor connected between the second input and the output of said first operational amplifier, a second resistor connected between the output of said second operational amplifier and the second input of said first operational amplifier, and a compensation capacitor connected between the output of said first operational amplifier and the first input of said second operational amplifier, the output of said first operational amplifier being connected to the output of the oscillator circuit, the capacitance of said compensation capacitor being selected to be substantially equal to the product of a stray capacitance existing in parallel to said electrostatic capacitance and the ratio of the resistance of said second resistor to the resistance of said first resistor.

* * * * *